July 5, 1960     E. R. SARGENT ET AL     2,943,685
FUEL SUPPLY CONTROL FOR ROTARY WING AIRCRAFT
Filed Feb. 21, 1956     2 Sheets-Sheet 1
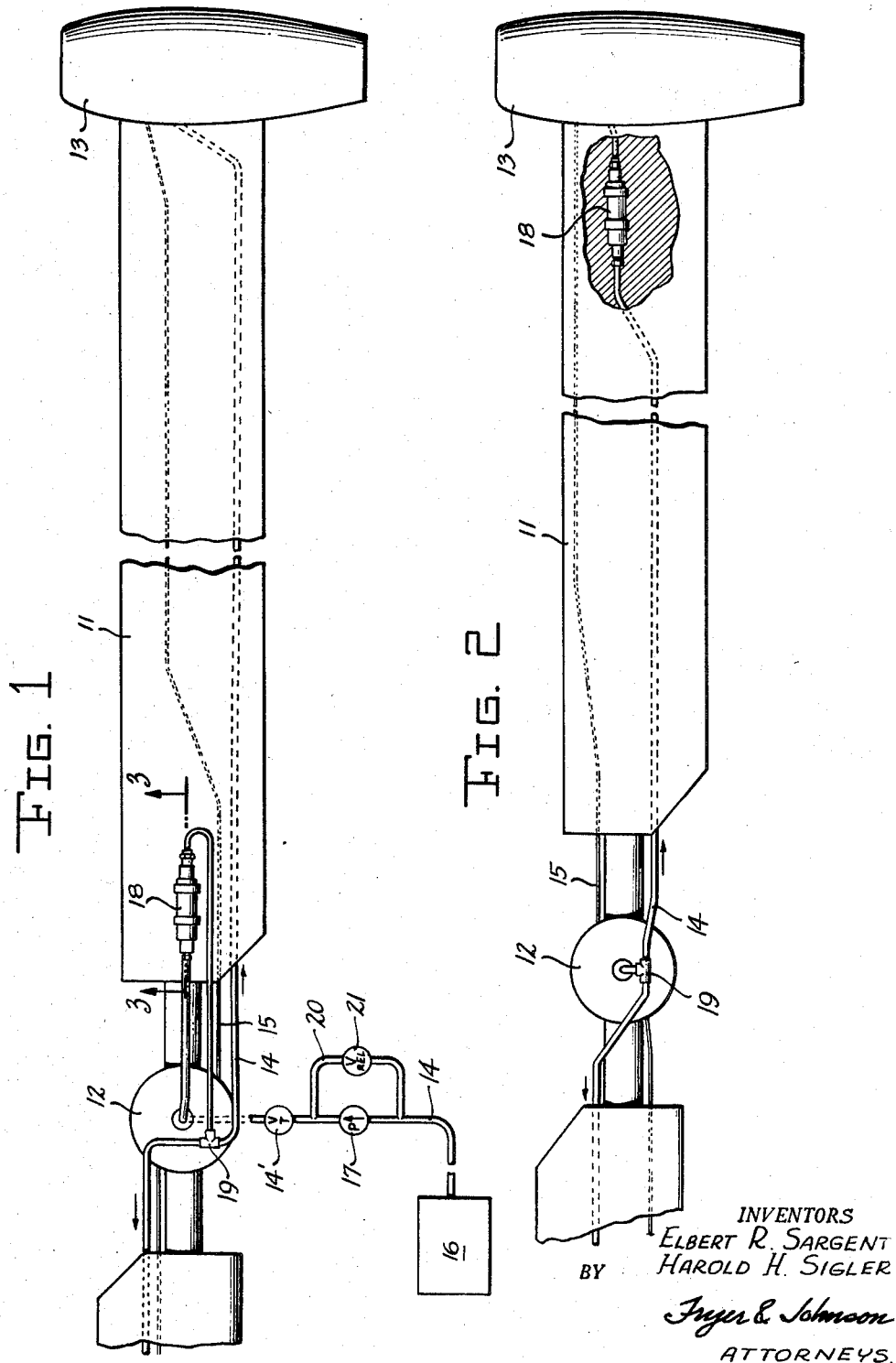
INVENTORS
ELBERT R. SARGENT
HAROLD H. SIGLER
BY
*Fryer & Johnson*
ATTORNEYS.

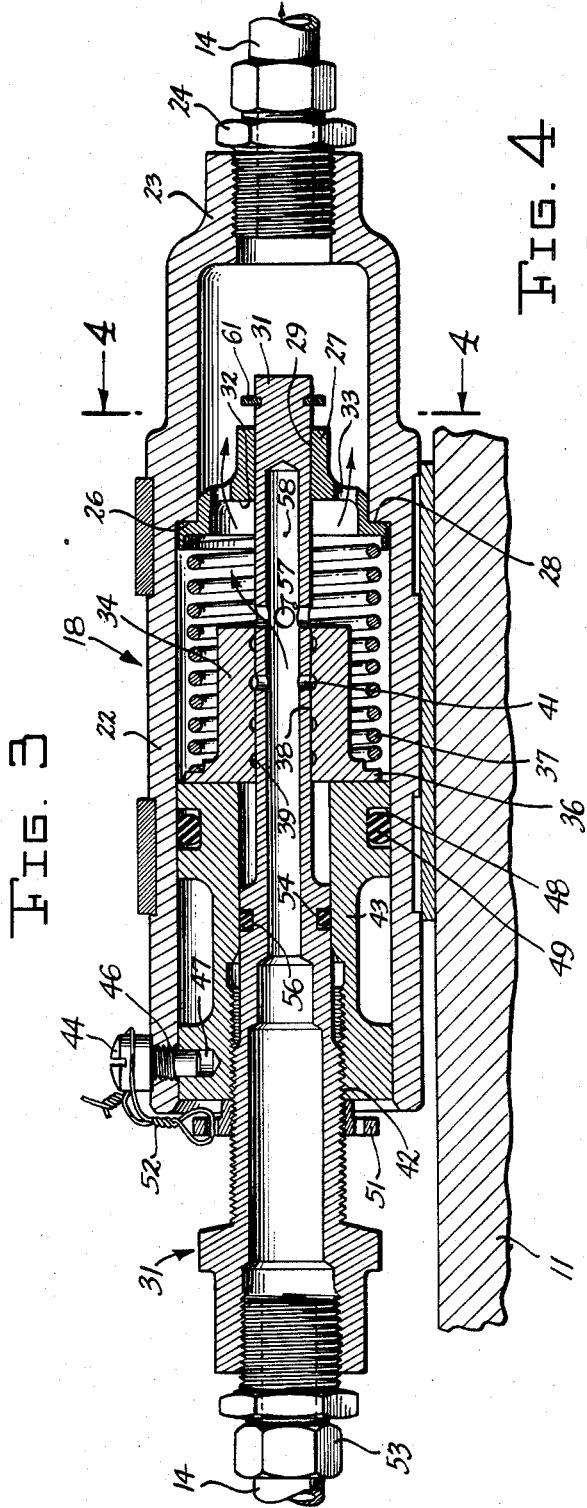
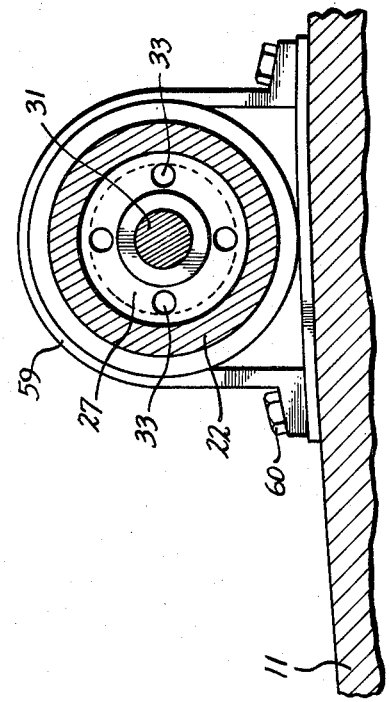

United States Patent Office 2,943,685
Patented July 5, 1960

2,943,685

FUEL SUPPLY CONTROL FOR ROTARY WING AIRCRAFT

Elbert R. Sargent, Menlo Park, and Harold H. Sigler, San Carlos, Calif., assignors to Hiller Aircraft Corporation, Palo Alto, Calif., a corporation of California Filed Feb. 21, 1956, Ser. No. 566,812

7 Claims. (Cl. 170—135.4)

This invention relates generally to rotary wing aircraft on which power for rotation of the rotor or helicopter blades is derived from jet engines, in particular ram jet engines, mounted on the rotor, as on the tips of the blades, and driving the rotor by a jet thrust reaction.

It is usual in such rotary wing aircraft to supply fuel to the engines from a pump mounted on the aircraft body proper; such pump delivers fuel from a tank to a fuel line mounted in or on the helicopter blade whence it is delivered to the jet engine for combustion. A pilot operated throttle is also provided to regulate the quantity of fuel delivered to the engines to accommodate varying pitches or load conditions and maintain a substantially constant blade speed.

The above described fuel supply system is not all that is to be desired. In conventional helicopter operation a substantially constant blade speed (r.p.m.) is desired and is attained in the above described systems by pilot control of the throttle. This introduces a lag in response to changes in blade speed due to the pilot's reaction time. Also, in aircraft having engines mounted on the tips of the blades, since the fuel pump and pilot's throttle are mounted on the aircraft cabin proper and so are usually separated from the tip-mounted jet engines by a considerable length of fuel supply line, there is a mechanical lag between throttle adjustments by the pilot and response of the engine to such adjustments.

Such lag in response is of particular concern when it is desired to reduce the pitch of the blade because the sudden reduction in load will cause an increase in blade speed which may exceed a predetermined maximum for safe and efficient operation unless fuel to the engine is immediately reduced, or reduced in anticipation of reduced blade pitch. The lag problem is also of concern when the blade pitch is increased because increased blade loading tends to reduce blade speed unless additional fuel is supplied to the engine to compensate for the added load and this might cause loss of altitude.

Thus, to maintain a desirable substantially constant blade speed in the above described prior jet driven rotary wing aircraft, it is necessary for the pilot to be constantly vigilant to correlate throttle settings to changes in blade loadings (i.e. pitch) to reduce or increase fuel supply to the engines to maintain a substantially constant blade speed. However, as above noted, there is a lag in making the necessary corrections due to the time it takes the pilot to react to the situation.

There is also a mechanical leg in engine response when reducing fuel supply to prevent overspeeding of the blades due to the fact that the centrifugal forces will continue to supply fuel to the engines until fuel in the line between the pilot's throttle and engines is reduced to a level called for by the new throttle setting. This will keep the engines firing for a period even after the pilot has reduced throttle and may cause further overspeeding of the blades due to the increased efficiency of ram jet engines at higher speeds. Conversely, when blade load increases there is a mechanical lag in engine response to increased fuel because of the time required for the increased supply of fuel to flow from the pilot's throttle in the aircraft cabin to the jet engines on the blade tips.

Summarizing this invention, it overcomes the above problems in jet powered helicopters and provides ways and means for utilizing blade rotation or more accurately, the centrifugal forces generated thereby, to automatically control fuel flow to the engines driving the blades to thereby maintain such blades at substantially constant speed and prevent either undesirable overspeeding or reduction in speed. To that end, it provides a device, simple and economical of construction and adapted to be mounted on or adjacent a helicopter blade for turning with such blade and at the same speed. Such device automatically throttles fuel supply to tip mounted ram jet engines in response to rotation of the blades upon which the engines are mounted.

The device of the present invention is completely automatic and, once pre-set on the ground to maintain a desired r.p.m. of the rotor, is directly responsive to centrifugal forces generated by rotation of the blades to accurately and automatically regulate fuel flow to the engines independently of the pilot's throttle and main fuel pump both of which may be set at maximum flow. Thus, the device of the present invention, which may be called a governor or a centrifugal force responsive valve, requires absolutely no pilot attention in flight and so reduces the burden on the pilot. Moreover, since the governor of the invention is directly responsive to blade speed, the problem of lag due to pilot reaction time is avoided and the above discussed mechanical lag due to long fuel lines is minimized.

Although the governor of the invention operates independently of the pilot's throttle, it is to be understood that such throttle is what regulates flow of fuel to the governor. Consequently, the pilot's throttle should be open to admit fuel from the pump into the fuel lines. Thereafter, the rate at which fuel is supplied to the engine is automatically determined by the governor to maintain a substantially constant blade speed at all blade loadings. Thus, if desired, the pilot's throttle may be left full open during flight without danger of overspeeding of the blades because the governor automatically regulates the actual fuel supply to the jet engines driving the blades.

Other and more specific objects of the invention will appear from the following description of the drawings which illustrate a preferred embodiment of the invention in combination with a ram jet engine mounted on the tip of a helicopter blade.

In the drawings:

Fig. 1 is a fragmentary top elevational view of a helicopter blade showing a method of mounting the governor to serve a plurality of jet engines on different blades. Only one fuel blade with engine is illustrated, the outer portion and engine of the other blade being omitted for purposes of clarity. Obviously the invention is not limited to rotary wing aircraft having a particular number of blades as it can be employed with any number of blades or engines. Fuel supply and ignition lines in the blade are shown in phantom lines and the blade is broken to indicate that it may be of any desired length. The fuel system for the aircraft is shown schematically.

Fig. 2 is a fragmentary top elevational view similar to Fig. 1 except that, as shown in the partially cut away section, the governor is mounted adjacent the tip of the blade to serve only the ram jet engine on that blade.

Fig. 3 is a partial sectional view taken in the plane of line 3—3 of Fig. 1, the governor shown in central section and the fuel line connections in elevation for clarity.

Fig. 4 is a sectional view taken in the plane of line 4—4 of Fig. 3.

In Fig. 1, there is shown helicopter blades 11 mounted on a rotor hub structure 12 for rotation about the axis of a rotor column or shaft (not shown) in the manner described in assignee's Patent No. 2,631,679, dated March 17, 1953, but any other suitable rotor mounting may be employed. At the outer tip of the blade is a ram jet engine 13 which, as is conventional, is powered by fuel supplied to it through a fuel line 14 extending radially from rotor hub 12 through or on the blade 11 to the engine 13. As is usual in such arrangements, spark for initial ignition of fuel is supplied through ignition line 15 which connects to a conventional spark plug or ignition rod (not shown) in the engine. Such engine may be of the type disclosed in assignee's copending applications, Serial Numbers 548,423 and 257,353 now Patent No. 2,740,482, filed November 22, 1955, and November 20, 1951, respectively.

Starting of such ram jet engines is usually accomplished by rotating the blades until sufficient forward speed is attained to insure a combustible air-fuel mixture in the engine 13 then igniting this mixture by a spark. After combustion has been initiated it is continuous, and reaction from rearwardly directed combustion gases moves the engine through the air to effect rotation of the blades 11.

Referring again to Fig. 1, fuel is supplied from a main fuel supply tank 16 located on or in the aircraft body (not shown) by a suitable fuel pump 17 and flows through the main fuel supply line 14 through a pilot's throttle valve 14', thence to and through a governor 18 mounted in such line 14 on the blade 11 and which, as hereinafter explained, regulates fuel flow in response to the rotational speed of the blades to maintain them at substantially constant speed under varying blade loading conditions. From governor 18, the fuel flows on through the main fuel line 14 to a T 19, thence through fuel lines 14 in each blade 11 to the engines 13, of which only one is shown in the drawings to simplify the description. As is usual in aircraft fuel systems, a by-pass line 20 and pressure relief valve 21 are provided to accommodate excess fuel flow through pump 17.

In the arrangement of Fig. 1, the governor 18 is positioned on the main fuel line 14 ahead of a dividing T junction 19 from which fuel is supplied to both engines. Consequently, the governor simultaneously regulates fuel flow to both engines and so maintains them at substantially equal power output which is necessary for smooth efficient operation. This arrangement is advantageous in that it requires only a single governor to regulate both or any number of engines on the same craft. However, due to the fact that the governor 18 is positioned adjacent the rotor hub 12, there is still some length of fuel line 14 to contribute to the hereinbefore described mechanical lag due to the time required for fuel flow in the line to adjust after the governor 18 has either restricted or increased such fuel flow in response to variations in blade r.p.m. from the desired constant speed. Thus, some mechanical lag is still possible, although a major source of lag, namely, pilot reaction and control, is eliminated.

If it is desired to substantially completely eliminate the mechanical lag, the modification of Fig. 2 may be employed. In such modification, a governor 18 is provided for each engine 13 and is mounted near the tip of blade 11 closely adjacent and inboard of engine 13. In such an arrangement the length of fuel line between the governor 18 and engine is substantially eliminated and when the governor responds to changes in blade rotation speed to reduce or increase fuel flow to the engine, there will be no lag in engine response thereto. This arrangement (Fig. 2) is desirable when more exact control is desired. Although not shown in Fig. 2, it is to be understood that any suitable fuel supply system may be used to supply fuel to the engines. For instance, the system shown schematically in Fig. 1 may be used, or any other suitable fuel supply system may be used for either of the modifications of the invention shown in Figs. 1 and 2.

Fig. 3 illustrates a preferred construction of an embodiment of the present invention in which the governor 18 comprises a generally cylindrical elongated outer housing 22 which is tapered at one end 23 and tapped to receive a fuel line 14 secured in place by a suitable nut assembly 24. Inside the housing 22 adjacent but spaced from its discharge end 23 is an annular shoulder 26. A first hub 27 is axially and slidably positioned in the housing and is provided with an annular flange 28 which butts against shoulder 26 of the housing. This hub has a central axial opening 29 for guiding and positioning a longitudinally extending hollow feed shaft 31 as hereinafter more fully explained. A face 32 of the hub, between axial opening 29 and flange 28 is provided with a plurality of openings 33 through which fuel flows when the governor is open. Since the primary function of first hub 27 is to hold feed shaft 31 in proper alignment, it may be replaced with other means to accomplish the same end. However, it is to be noted that any device utilized for this purpose should also be of such construction as to permit the passage of fuel.

A second hub 34 is positioned in housing 22 in substantial axial alignment with first hub 27. Such second hub is also provided with an annular flange 36 for engagement with a coil spring 37, which is calibrated to predetermined compression force for a reason to be subsequently explained, and is positioned between hubs 27 and 34 to urge them apart and thus keep them spaced apart axially.

The second hub 34 is also provided with a central or axial opening 38 to permit relative sliding movement between it and hollow feed shaft 31. To provide lubrication for axial sliding of shaft 31 in such hub opening 38, the inner wall of the opening is provided with a series of annular grooves 39, which are adapted to register with openings 41 in the hollow shaft 31 during axial movement of the hub 34 to admit a portion of fuel to serve as a lubricant.

As hereinbefore noted, feed shaft 31 is guided at one end by first hub 27. Such shaft 31 is further supported and guided at an inlet end 42 of the housing 22 by an axial bushing 43 fixed in position in such housing by a safety screw 44 which projects through a tapped hole 46 in the housing 22 into a drilled hole 47 in bushing 43. To prevent leakage, bushing 43 is provided with an annular groove 48 on its outside periphery in which is fitted a conventional packing washer 49.

The hollow shaft 31 through which fuel flows, is threaded adjacent its outside end to permit it to be screwed into bushing 43 in order to locate it in a desired position, as hereinafter described. A lock nut 51 is also threaded on the outside of shaft 31 to lock the same in any desired position. Additional security against movement of the shaft and inadvertent changing of the governor setting is provided by a safety wire 52. Fuel is initially supplied to shaft 31 through fuel line 14 which is suitably secured in the outside end of shaft 31 by a conventional nut assembly 53. Leakage around shaft 31 is prevented by packing washer 54 positioned in an annular groove 56 on the periphery of such shaft where it passes through bushing 43 adjacent the inlet end of the governor.

When the governor is open (as in Fig. 3), fuel enters the governor 18 from fuel line 14, passes into hollow shaft 31, flows out through outlet ports 57 in such shaft, thence out ports 33 in first hub 27, and finally flows through a continuation of fuel line 14 to the engines (13 of Figs. 1 and 2). Since the governor is mounted on the helicopter blade 11 with its discharge end pointing outwardly from the rotor hub 12, centrifugal forces act on slidable hub 34, thus urging it toward the first hub 27 against resistance of calibrated coil spring 37.

As rotational speed of the blade 11 increases, so do the centrifugal forces acting on slidable hub 34; and when these forces exceed the resistance to compression of spring 37, hub 34 slides axially under the action of centrifugal force and against the action of spring 37 along shaft 31 toward first hub 27. As hub 34 slides, it passes over and partially closes fuel discharge ports 57 in shaft 31, thus restricting fuel flow therethrough. Conversely, decreased blade speed reduces centrifugal force and spring 37 forces slidable hub 34 away from first hub 27, thus opening ports 57 wider to increase fuel supply. Thus hub 34 serves not only as a metering valve to control opening and closing of ports 57 but also acts as a governing weight working under the urge of centrifugal force against spring 37.

Such fuel flow regulation results in a corresponding change in engine power output, either increasing or decreasing power as the case may be.

The governor is preset to maintain a desired r.p.m. Such presetting is done by positioning shaft 31 so that its outlet ports 57 will be in proper cooperative alignment or position relative to bushing 34 so that a constant blade speed will be maintained at all blade loadings. This may be suitably accomplished by adjusting the parts to provide the correct fuel supply to maintain the desired blade speed at optimum blade pitch and loading. Obviously, all such settings are correlated with the calibrated spring 37 as that is what determines the amount of movement of the hub 34 relative to shaft 31.

To insure against complete stoppage of fuel under unusual conditions which may occur and which would cause the fire to go out in the ram jet engine, a small auxiliary fuel port 58 is provided in shaft 31. Thus, if for any reason the blade speed increases sufficiently to cause complete closing of ports 57 by hub 34, a relatively small amount of fuel will still be supplied through auxiliary ports 58 in sufficient quantity to maintain continuous combustion in the engine. This is important because it insures against complete stoppage of engine firing in the air. In this connection, spring 37 is of sufficient strength to prevent complete closing of ports 58 by hub 34.

It is to be noted that the size of the primary openings or ports 57 and the smaller auxiliary ports 58 are correlated so that together they provide a proper fuel flow in normal operation. Obviously, the particular size and arrangement of such ports may be varied to accommodate different conditions.

It will be noted that the governor 18 operates entirely independently of the usual fuel pump and throttle on the aircraft, thus no pilot adjustment of the throttle is required either to reduce or increase fuel flow through the governor. This is important because it frees the pilot completely of the burden of throttle adjustment to maintain constant blade speed; and the throttle may be left full open if desired since fuel flow to the engines is controlled by the governor.

Hollow fuel shaft 31 may be adjusted longitudinally of housing 22 to provide for variation in the fuel flow at the desired constant blade speed and to accommodate varying load conditions. Such adjustment is also of use if it is desired to maintain a higher constant blade rotation speed from any given setting. In such a case, shaft 31 is advanced further into bushing 43. This will move fuel ports 57 further away from hub 34, consequently more centrifugal force must be generated (a higher blade speed) to compress spring 37 sufficiently to slide the bushing across such ports. Conversely, if a lower constant blade speed is to be maintained, then shaft 31 is backed out some to bring ports 57 closer to the bushing 34 (as in Fig. 3), thus requiring less movement to restrict the port openings.

Coil spring 37 is calibrated as to its compression characteristics and positioning of the fuel shaft 31 is correlated with the spring. Also, the weight of the slidable hub 34 is correlated to the spring compression.

Although the governor is shown in the fully open position, it is to be understood that in normal operation on a rotating blade set at an intermediate or cruising pitch, hub 34 will have the ports 57 partly closed. In other words, the average position of hub 34 in operation is partly over the ports. Thus, on increased blade pitch the resulting decreased blade speed will open ports 57 further; and decreased blade pitch with resulting increased blade speed will restrict the opening in ports 57.

As shown, the entire governor is in the form of a unitary structural assembly. Hence it can be mounted readily as a complete unit on or in the helicopter blade 11 and may be secured thereto for unitary rotation therewith in any suitable manner, such as by clamps 59 and bolts 60.

In this connection, it is to be noted that the governor construction is such that adjustment or disassembly of the governor may be readily accomplished without removing the governor from its mounting. Thus, all interior parts i.e. shaft 31, hubs 27 and 34, bushing 43, and spring 37 can be removed from the housing 22 simply by loosening lock nut 51 and screw 44, then unscrewing shaft 31. The inner assembly is held together for removal as a unit by a snap ring 61 on the inner end of shaft 31.

Although the invention has been described with reference to an arrangement wherein fuel initially enters the governor through the hollow shaft 31 and is discharged from tapered end 23, it is to be understood that the fuel flow can be reversed if desired. However, the governor itself should always be positioned as shown so that centrifugal forces will move slidable hub 34 radially outwardly with respect to the rotor to compress spring 37 to restrict ports 57 on increased rotor speed, and spring 37 will move hub 34 radially inwardly on decreased rotor speed to open ports 57. Also, the invention is not limited to use on rotary wing aircraft having only two blades and engines, as it may be used on such aircraft having any number of blades and engines.

It will be noted that the primary fuel ports 57 are shown as a series of staggered overlapping ports of various sizes, with smaller ports arranged to close last. Such an arrangement is not critical but is one method of insuring proper orifice openings for correct fuel flow at all positions of second hub 34. Also, if desired, the auxiliary or idler ports 58 can be fitted with adjustable sleeves, or the ports can be made in the end of shaft 31 and constructed as needle valves to provide for adjustment of the auxiliary fuel flow through such ports.

In the embodiment shown, overspeeding of the rotor in the event of collapse or breakage of spring 37 is insured against by making slidable hub 34 of a sufficient length to extend from face 32 of hub 27 rearwardly beyond ports 57. Thus, if spring 37 collapses or breaks so that slidable hub 34 bottoms against face 32, such hub will still completely cover and close ports 57 to prevent uncontrolled overspeeding of the rotor. If slidable hub 34 does bottom against face 32, it will also close off idler port 58, but this will not matter, as the aircraft can be landed under auto rotation.

We claim:

1. In combination with a helicopter blade mounted for rotation, a jet engine mounted on the blade for driving thereof, a fuel supply conduit for supplying fuel to said engine, and a governor mounted in said conduit and rotating with said blade for controlling automatically the supply of fuel to said engine in response to variations in centrifugal force whereby the need for manual fuel control is precluded, said governor comprising a housing through which fuel is adapted to flow, a hollow member within said housing having a primary opening through which fuel flowing through said housing is adapted to flow, a spring loaded valve member slidably mounted in said housing in contact with said hollow member and in alignment with said primary opening of said hollow member, said valve member being slidably responsive to centrifugal force and being movable under urge of such force to effect restriction of fuel flow through said primary opening, and a relatively smaller auxiliary opening in said hollow member spaced from said primary opening for permitting fuel flow through said housing to said engine when said primary opening is closed by said valve member whereby operation of said engine may be maintained continuous under substantially all conditions during flight.

2. In a helicopter having jet engine powered rotor blades mounted for rotation about an upright rotor axis, a governor responsive to variations in centrifugal force for regulating speed of rotation of such rotor blades automatically by metering fuel to said engine independently of manual pilot control comprising a unitary housing mounted transverse to said rotor axis in a plane substantially parallel to the plane of said rotor blades for rotation therewith, conduit means fixedly positioned in said housing and adapted for fuel flow therethrough to said engine, said conduit means having an aperture in the wall thereof, a fuel metering valve slidably mounted in said housing adjacent said aperture, said aperture normally being free of restriction when said rotor blades are at rest or are rotating at low speed, said valve being slidable upon increased speed of rotation of said rotor blades under the urge of centrifugal force toward an end of said conduit whereby said valve closes said aperture thereby restricting fuel flow to said engine, and a calibrated spring positioned in said housing against said valve urging said valve away from said end of said conduit upon decreased speed of rotation of said rotor blades whereby said valve automatically opens said aperture thereby allowing full fuel flow to said engine.

3. A governor responsive to variations in centrifugal force for maintaining automatically and independently of manual pilot control a substantially constant predetermined speed of rotation for jet propelled rotor blades of a helicopter comprising an elongated housing, a hollow conduit having the wall thereof apertured intermediate the ends thereof extending into said housing and adjustably yet fixedly mounted therein, the outer end of said conduit having means thereon connectable to fuel supply means for providing fuel for consumption by a jet engine mounted on one of said rotor blades whereby fuel may flow into said conduit and through the aperture therein into said housing and therefrom into said jet engine, combined governor weight and valve means slidably mounted about said conduit in said housing for movement thereon back and forth relative to the aperture therein, and a calibrated spring in said housing engaging said valve means and urging the same away from said aperture whereby said aperture is unrestricted when said blades are at rest or are rotating at speeds below a predetermined rate.

4. The combination with a helicopter rotor mounted for rotation about an upright rotor axis and having jet engine power means mounted for rotation with said rotor, of fuel metering governing mechanism which is operatively responsive to variations in centrifugal force and operatively independent of pressure of fuel to be metered thereby to said jet engine power means comprising a unitary structure including a housing mounted for rotation with said rotor, a tube fixedly positioned in said housing and extending in a generally horizontal direction transverse to said rotor axis, said tube having a fuel outlet port in the wall thereof, a combined valve and governor weight positioned around said tube and slidable thereon in response to variations in centrifugal force relative to said outlet port to control flow of fuel therethrough automatically and independently of manual pilot control, and resilient means in said housing urging said combined valve and governor weight away from said outlet port toward said rotor axis and resisting outward movement thereof under the action of centrifugal force.

5. The combination of claim 4 wherein said housing is positioned directly on said rotor.

6. A fuel metering governor which is operatively responsive to variations in centrifugal force and operatively independent of pressure of fuel to be metered thereby for maintaining automatically a substantially constant predetermined speed of rotation of a helicopter rotor propelled by a jet engine mounted thereon, comprising a hollow housing to be mounted for rotation with said rotor, a fuel supply conduit extending into said housing and being adjustably yet fixedly secured in an end thereof, a wall of said conduit having an aperture therein which is normally unrestricted whereby fuel introduced into said conduit may flow through said aperture to said engine, a fuel metering valve slidably mounted in said housing for movement relative to said conduit wall toward or away from said aperture for restricting or unrestricting the same, and resilient means urging said valve away from said aperture whereby said aperture is maintained unrestricted when said rotor is at rest or is rotated at speeds below a predetermined rate, said valve overcoming the urge of said resilient means and being slidable toward said aperture for restricting the same in response to centrifugal force acting thereon when said rotor is rotated at speeds above said predetermined rate, said aperture thereby being automatically restricted or unrestricted in response to variations in centrifugal force to control fuel flow to said engine automatically and independently of manual adjustment whereby overspeeding of said rotor is precluded.

7. In a helicopter having a jet engine powered rotor, a fuel metering governor for regulating speed of rotation of said rotor independently of manual pilot control by metering fuel to such engine automatically, said governor being operatively responsive to variations in centrifugal force to effect such fuel metering and being operatively independent of pressure of such fuel metered whereby speed of rotation of said rotor may be maintained substantially constant and the need for manual speed control is precluded, said governor comprising a hollow housing mounted for rotation with said rotor, a fuel supply conduit extending into said housing and being fixedly secured therein, a wall of said conduit having an aperture therein which is normally unrestricted and through which fuel may be metered to said engine, a fuel metering valve movably positioned between said conduit wall and said housing for movement toward or away from said aperture for restricting or unrestricting the same, and spring means normally urging said valve away from said aperture whereby fuel may flow unrestricted through said aperture when said rotor is at rest or is rotated at speeds below a predetermined rate, said valve overcoming the urge of said spring means and being movable toward said aperture to restrict the same at speeds of rotation of said rotor above said predetermined rate due to centrifugal force produced by such rotation whereby fuel flow through said aperture to said engine is automatically controlled in response to variations in centrifugal force and overspeeding of said rotor is precluded.

References Cited in the file of this patent

UNITED STATES PATENTS

| | | |
|---|---|---|
| 1,292,346 | Martin | Jan. 21, 1919 |
| 2,622,394 | Murdock | Dec. 23, 1952 |
| 2,667,226 | Doblhoff | Jan. 26, 1954 |
| 2,716,459 | Toney et al. | Aug. 30, 1955 |